(12) United States Patent
Berezin et al.

(10) Patent No.: US 9,928,673 B2
(45) Date of Patent: Mar. 27, 2018

(54) VEHICLE PEPS SYSTEM USING DIRECTIONAL SENSORS

(71) Applicant: GM Global Technology Operations LLC, Detroit, MI (US)

(72) Inventors: Vyacheslav Berezin, New Market (CA); Shaun S. Marshall, Post Perry (CA); Moshe Laifenfeld, Haifa (IL); Timothy J. Talty, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/801,296

(22) Filed: Jul. 16, 2015

(65) Prior Publication Data

US 2017/0018128 A1 Jan. 19, 2017

(51) Int. Cl.
| | | |
|---|---|---|
| *G05B 19/00* | (2006.01) | |
| *G05B 23/00* | (2006.01) | |
| *G06F 7/00* | (2006.01) | |
| *G06F 7/04* | (2006.01) | |
| *G06K 19/00* | (2006.01) | |
| *G08B 29/00* | (2006.01) | |
| *G08C 19/00* | (2006.01) | |
| *H04B 1/00* | (2006.01) | |

(Continued)

(52) U.S. Cl.
CPC ........ *G07C 9/00111* (2013.01); *G01S 5/0205* (2013.01); *G01S 5/0284* (2013.01); *G01S 5/04* (2013.01); *H04W 4/008* (2013.01); *G07C 2009/00984* (2013.01)

(58) Field of Classification Search
CPC ..... G07C 9/00111; G07C 2009/00984; H04W 4/008; G01S 5/0284
USPC ...................................................... 340/5.61
See application file for complete search history.

(56) References Cited

U.S. PATENT DOCUMENTS

| | | | |
|---|---|---|---|
| 2010/0026503 A1* | 2/2010 | Proefke .................. | G01C 5/06 340/601 |
| 2012/0244877 A1* | 9/2012 | Margalef .............. | G01S 5/0252 455/456.1 |

(Continued)

OTHER PUBLICATIONS

Ahmad, Saleem, et al., "Bluetooth an Optimal Solution for Personal Asset Tracking: A Comparison of Bluetooth, RFID and Miscellaneous Anti-lost Traking Technologies", School of Management and Economics, University of Electronic Science and Technology of China, International Journal of u- and e-Service, Science and Technology, vol. 8, No. 3 (2015), pp. 179-188.

(Continued)

*Primary Examiner* — Tanmay Shah
(74) *Attorney, Agent, or Firm* — David Willoughby; Reising Ethington P.C.

(57) ABSTRACT

A system and method of locating a key fob with respect to a vehicle includes: communicating between a plurality of directional sensors used by the vehicle and a key fob via a short-range wireless signal; generating signal data at the plurality of directional sensors or the key fob indicative of one or more attributes of the short-range wireless signal; generating location information based on the one or more attributes by processing the signal data generated by the plurality of directional sensors or the key fob; and determining the location of the key fob relative to the vehicle based on the generated location information.

20 Claims, 3 Drawing Sheets

(51) Int. Cl.
H04B 1/38 (2015.01)
H04Q 1/00 (2006.01)
H04Q 9/00 (2006.01)
G07C 9/00 (2006.01)
H04W 4/00 (2018.01)
G01S 5/02 (2010.01)
G01S 5/04 (2006.01)

(56) References Cited

U.S. PATENT DOCUMENTS

| | | | | |
|---|---|---|---|---|
| 2013/0090744 A1* | 4/2013 | Tran | ............ | G05B 11/01 |
| | | | | 700/9 |
| 2013/0202128 A1* | 8/2013 | Jain | ............ | G06Q 30/0201 |
| | | | | 381/76 |
| 2014/0129051 A1* | 5/2014 | Gautama | ............ | B60R 25/245 |
| | | | | 701/2 |
| 2014/0188348 A1* | 7/2014 | Gautama | ............ | B60W 10/30 |
| | | | | 701/48 |
| 2014/0330449 A1* | 11/2014 | Oman | ............ | G01S 13/765 |
| | | | | 701/2 |
| 2015/0028995 A1* | 1/2015 | Gautama | ............ | B60R 25/406 |
| | | | | 340/5.72 |
| 2015/0318904 A1* | 11/2015 | Lee | ............ | H04B 7/024 |
| | | | | 455/63.4 |

OTHER PUBLICATIONS

Dahlgren, Erik, et al., "Evaluation of indoor positioning based on Bluetooth Smart technology", Master of Science Thesis in the Programme Computer Systems and Networks, Chalmers University of Technology Department of Computer Science and Engineering, Goteborg, Sweden, Jun. 2014.

* cited by examiner

VEHICLE PEPS SYSTEM USING DIRECTIONAL SENSORS

TECHNICAL FIELD

The present invention relates to passive entry passive start (PEPS) systems used in vehicles and, more particularly, to the use of directional sensors to control vehicle access as part of a PEPS system.

BACKGROUND

Modern vehicles use wireless key fobs that restrict both interior access as well as the ability to operate the vehicle. Authorized vehicle users can carry the wireless key fobs and as they approach the vehicle it can determine whether the unique wireless signal transmitted by the key fob is authorized for access and/or operation. If so, the vehicle user can enter and subsequently start the vehicle. These systems are often referred to a passive entry passive start (PEPS) systems. Before the vehicle user can start the vehicle, it determines whether or not the key fob is located inside the vehicle. Given that the threshold for the determination of being inside of or outside of the vehicle can be relatively small, resolving the location of the key fob in the vehicle may call for a high degree of accuracy.

Presently, PEPS systems and key fobs use omni-directional antennas that receive wireless signals without regard to the direction from which they are received. These omni-directional antennas may be effective when used with active systems in which a user presses a button on a key fob to actively control a vehicle function, such as unlocking the doors. In those systems, the signal direction may not be important. But in PEPS systems, the wireless signal is used to determine the location of the key fob and omni-directional antennas can limit PEPS system performance. For example, the wireless signal transmitted by a key fob may reflect off of surfaces before ultimate receipt by an omni-directional antenna. When such reflections occur, determining the ultimate location of the key fob can be challenging. And these reflections occur more frequently as the frequency at which the key fob transmits increases.

SUMMARY

According to an embodiment of the invention, there is provided a method of locating a key fob with respect to a vehicle. The method includes communicating between a plurality of directional sensors used by the vehicle and a key fob via a short-range wireless signal; generating signal data at the plurality of directional sensors or the key fob indicative of one or more attributes of the short-range wireless signal; generating location information based on the one or more attributes by processing the signal data generated by the plurality of directional sensors or the key fob; and determining the location of the key fob relative to the vehicle based on the generated location information.

According to another embodiment of the invention, there is provided a method of locating a key fob with respect to a vehicle. The method includes communicating between a plurality of directional sensors used by the vehicle and a key fob via one or more short-range wireless signals transmitted according to a Bluetooth Low Energy (BLE) protocol, a Wi-Fi protocol, or both protocols; generating signal data at the plurality of directional sensors indicative of one or more attributes of the short-range wireless signal(s); generating location information based on the one or more attributes by processing the signal data generated by the plurality of directional sensors or the key fob; and determining the location of the key fob relative to the vehicle based on the generated location information.

According to another embodiment of the invention, there is provided a system for locating a key fob with respect to a vehicle. The system includes a plurality of directional sensors affixed to a vehicle; a vehicle systems module (VSM) communicatively linked to the plurality of directional sensors and receiving signal data from the plurality of directional sensors that is indicative of one or more attributes of a short-range wireless signal transmitted from the key fob, wherein the VSM determines the position of the key fob relative to the vehicle based on the signal data from the plurality of directional sensors.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The system and method described below uses directional sensors to locate a key fob with respect to a vehicle. Vehicles equipped with a plurality of directional sensors can use those sensors to communicate (i.e., transmit or receive) a wireless signal between the key fob and the sensors. The wireless signal can then be used to determine a key fob location as part of a passive entry passive start (PEPS) system based on signal data generated by the directional sensors or the key fob. When each of the directional sensors generates signal data for the received signal, such as an angle of arrival (AoA), an angle of departure (AoD), or a received signal strength indicator (RSSI), the PEPS system and its plurality of directional sensors can compensate for signals that were reflected off another object using the signal data.

In a brief example of how a PEPS system using directional sensors can work, six directional sensors may be positioned in various locations and directions for receiving a wireless signal from the key fob. At one moment, it is possible that five of the directional sensors generate signal data that indicates the signal arrives from one direction while one of the directional sensors indicates that the signal is arriving in a different direction. An electronic control unit used by a vehicle systems module (VSM) or other similar computing device can identify the anomalous directional sensor that generated different signal data from the other directional sensors and determine that the sensor measured a reflected signal. The VSM can decide to ignore that particular directional sensor or accord it less weight. This is merely one example among different arrangements of directional sensors used with PEPS systems and as will be appreciated from the discussion below other implementations of the directional sensors are possible.

Figure 1:
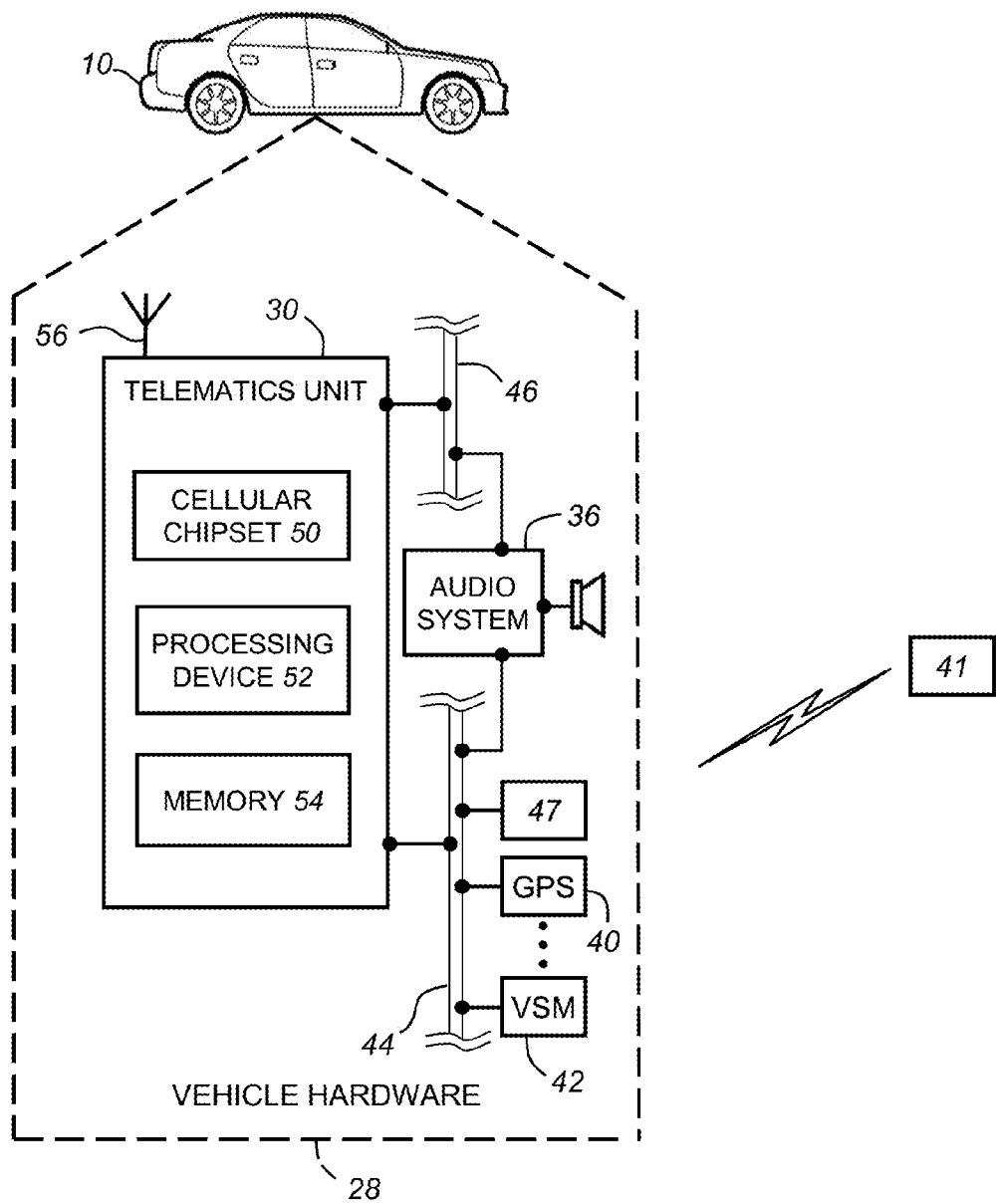
FIG. 1 is a block diagram depicting an embodiment of a vehicle that is capable of using the method disclosed herein.

With reference to FIG. 1, there is shown a vehicle 10 that can be used to implement the method disclosed herein. It should be understood that the disclosed method can be used with any number of different systems and is not specifically limited to the vehicle or its environment shown here. Also, the architecture, construction, setup, and operation of the vehicle 10 and its individual components are generally known in the art. Thus, the following paragraphs simply provide a brief overview of one such vehicle 10; however, other vehicle configurations not shown here could use the disclosed method as well.

Vehicle 10 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1 and includes a telematics unit 30 and a GPS module 40 as well as a number of vehicle system modules (VSMs) 42. Many of these devices are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over a wireless carrier system and via wireless networking. This enables the vehicle to communicate with call centers, other telematics-enabled vehicles, or some other entity or device. The telematics unit preferably uses radio transmissions to establish a communications channel (a voice channel and/or a data channel) with a wireless carrier system so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at a call center) and data communication (e.g., to provide GPS location data or vehicle diagnostic data to the call center), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more short-range wireless protocols, including short range wireless communication (SRWC) such as any of the IEEE 802.11 protocols, WiMAX, ZigBee™, Wi-Fi direct, Bluetooth LE, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation of GPS satellites. From these signals, the module 40 can determine vehicle position that is used for providing navigation and other position-related services to the vehicle driver. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center via the telematics unit 30.

Apart from the audio system 36 and GPS module 40, the vehicle 10 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module (BCM) that governs various electrical components located throughout the vehicle, like the vehicle's power door locks, ignition switch, and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 10, as numerous others are also possible.

The VSM 42 implemented as a body control module can also be used to provide the passive entry passive start (PEPS) functionality used at the vehicle 10. PEPS functionality can be used to control vehicle access, such as an ability to open and close vehicle doors or activate the vehicle powertrain. A key fob 41 transmits and receives short-range wireless signals with a plurality of directional sensors 47. The directional sensors 47 can be implemented using different types of hardware capable of detecting a wireless signal and then generating signal data, such as AoA, AoD, or RSSI. Different embodiments of the directional sensors 47 can be implemented using directional antennas, beam-forming antennas, or directional arrays. And each of these embodiments can be implemented in different ways. For example, a directional sensor 47 can be implemented as a phased array that uses six individual antennas spaced from each other and arranged substantially linearly. In some implementations, the front-to-back ratios of the directional sensors 47 can range from 10-18 dB. Also, some implementations can be configured to send short-range wireless signals using either the Bluetooth LE protocols or Wi-Fi protocols. In these implementations, the key fob 41 and the directional sensors 47 are configured to operate in the 2.4 GHz frequency band that is associated with the protocols. However, it is possible to configure systems that implement the directional sensors with key fobs that operate using a higher frequency, such as 3.6 GHz, 5 GHz, and 60 GHz frequency bands already used or envisioned for future Wi-Fi protocols, as well as the UHF frequency band presently used by PEPS systems, which can be found between 300-400 MHz. As a vehicle user approaches the vehicle 10, a short-range wireless signal transmitted by the key fob 41 can be received using a plurality of the directional sensors 47 that are positioned inside of the vehicle 10. The directional sensors 47 can also transmit short-range wireless signals that can be received by the key fob 41 according to different short-range wireless protocols, such as the Bluetooth LE and WiFi protocols.

The key fob 41 can be implemented as a handheld wireless device that includes a microprocessor, a memory device, and an antenna capable of communicating wireless signals over a short distance (e.g., <50 meters) and located within a housing. In one implementation, the key fob 41 can be configured to use a symmetrical encryption scheme to securely communicate with a particular vehicle 10. For example, both the key fob 41 and the VSM 42 in the vehicle 10 can each receive a copy of a secret encryption key that is used to encode data sent over the short-range wireless signal. The secret key at either the key fob 41 or the VSM 42 can be used by a cryptographic hash function stored in the memory portion of either device to create a message authentication code (MAC). The MAC can be sent via the short-range wireless signal and received at the key fob 41 or VSM 42 where it can be authenticated using the secret key. In some configurations, the key fob 41 may be a dedicated device solely used to control vehicle functions, like opening vehicle doors or flashing exterior lights. Or in a different configuration, the key fob 41 can be integrated into a vehicle user's handheld wireless device, such as a smartphone or tablet that includes the ability establish Bluetooth LE and Wi-Fi connections.

The VSM 42 can be communicatively linked to the directional sensors 47 via the vehicle communications bus 44 or discrete communication lines (wired or wireless) such that the content of the detected short-range wireless signals can be communicated to the VSM 42, the processor 52 of the vehicle telematics unit 30, or both. The VSM 42 can include computer-processing capabilities in the form of a microprocessor and optionally a computer-readable memory device that the microprocessor can access to retrieve executable computer programs and store data. The cryptographic hash function and secret key could be stored at the microprocessor itself using internal memory or the computer-readable memory device accessible by the microprocessor.

Figure 2:
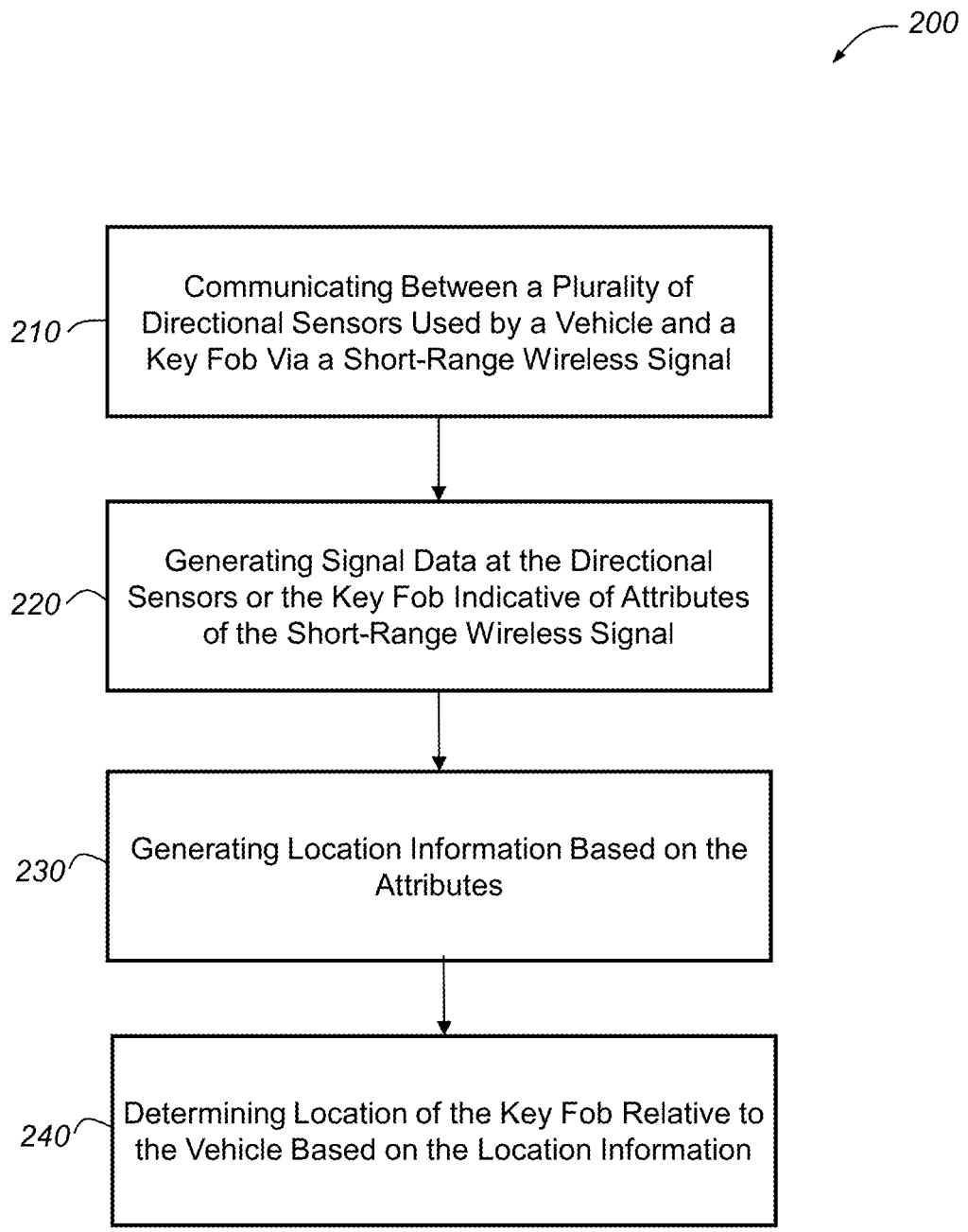
FIG. 2 is a flow chart depicting an embodiment of a method of locating a key fob with respect to a vehicle.
Figure 3:
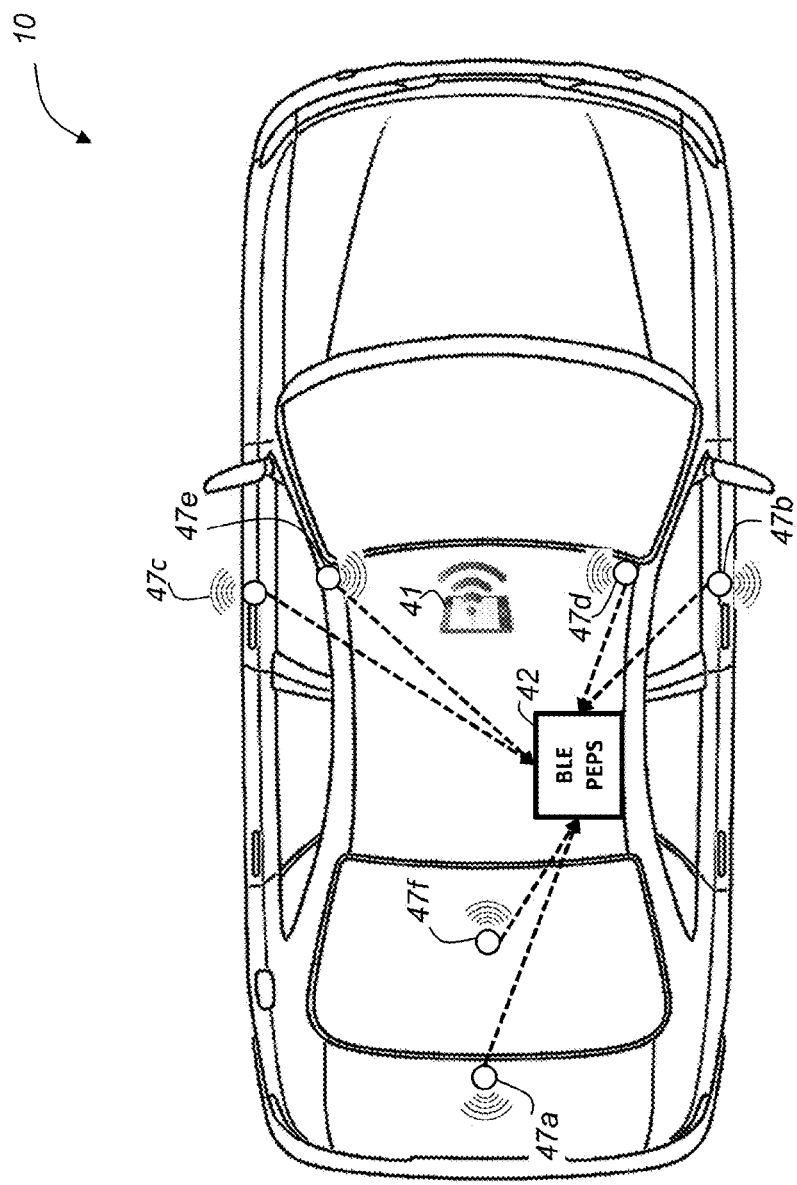
FIG. 3 is a projection view of an embodiment of a vehicle that is capable of using the method disclosed herein.

Turning now to FIG. 2, there is shown a method 200 of locating the key fob 41 with respect to the vehicle 10. The method 200 begins at step 210 by receiving, at a plurality of directional sensors 47 used by the vehicle 10, a short-range wireless signal transmitted from the key fob 41. The vehicle 10 includes directional sensors 47 placed at defined areas of the vehicle 10 and aimed in a particular direction. For example, an embodiment depicting how the directional sensors 47 can be arranged is shown in FIG. 3. There, the vehicle 10 is shown including a directional sensor 47a at the rear of the vehicle 10 that is aimed away from the interior of the vehicle 10 as well as two directional sensors (47b and 47c) that are positioned on the vehicle doors and aimed away from the vehicle 10. Two directional sensors (47d and 47e) are shown positioned adjacent to the front seats of the vehicle and directed toward the interior of the vehicle 10 while another directional sensor 47f is placed near the back seat of the vehicle 10 and aimed toward the interior of the vehicle 10. As a vehicle user approaches or sits inside of the vehicle 10 with the key fob 41, the directional sensors (47a-47f) receive the short-range wireless signal wirelessly transmitted by the key fob 41. The wireless signal can be transmitted from the key fob 41 according to a Bluetooth Low Energy (BLE) protocol, a Wi-Fi protocol, or both protocols. While the method 200 will be described largely in terms of the directional sensors 47a-47f receiving short-range wireless signals from the key fob 41, it should be appreciated that method 200 can also be implemented by directional sensors 47a-47f that transmit short-range wireless signals that are received by the key fob 41. The method 200 proceeds to step 220.

At step 220, signal data indicative of the short-range wireless signal is generated at the plurality of directional sensors 47a-47f. Depending on the location of the key fob

41, each of the directional sensors 47a-47f can generate different signal data based on its reception of the same short-range wireless signal. Examples of measurements that are indicative of signal data include RSSI, AoA, and AoD. For instance, if the user holding the key fob 41 approaches the vehicle 10 from the right side of the vehicle 10, the directional sensors 47a and 47b can generate signal data that differs from what is gathered by the remaining directional sensors 47c-47f and indicates that the key fob 41 is nearer those directional sensors 47a-47b. In this example, the directional sensors 47a-47b can generate signal data with a higher RSSI relative to the RSSI detected by the directional sensors 47c-47f. In addition, the directional sensors 47a-47b can use the detected AoA of the received wireless signal to further refine an estimation of the location of the key fob 41. Apart from the directional sensors 47a-47b, the directional sensors 47c-47f can also contribute to the location estimation as well. These sensors can generate small RSSI but also provide an AoA for the received signal that can further clarify the key fob location. Alternatively, the key fob 41 can receive a short-range wireless signal transmitted from one or more directional sensors 47a-47f. The directional sensors 47a-47f can determine the AoD of the signal(s) transmitted to the key fob 41 and optionally transmit the AoD measured by each sensor to the key fob 41. The key fob 41 can receive the signal(s), note the AoA of the signal(s) received from the directional sensors 47a-47f, and determine location at the key fob 41 using the AoA, AoD measured at each sensor, or both. It is also possible for the key fob 41 to return the AoA to the directional sensors 47a-47f for determining key fob location at the vehicle 10.

In a different example, a user can sit in the vehicle 10 with the key fob 41. When the key fob 41 is located in the vehicle 10, the directional sensors 47d-47f can generate a higher RSSI relative to the directional sensors 47a-47c. Further, the directional sensors 47d-47f can also generate additional signal data in form of AoA measurements that can precisely determine whether or not the key fob 41 is located inside of the vehicle 10. At the same time, the directional sensors 47a-47c may not detect the signal from the key fob 41 thereby further indicating that the key fob 41 is located in the vehicle. The two examples discussed above are told as snapshots of what the directional sensors 47a-47f detect at particular times. However, it should be appreciated that the directional sensors 47a-47f can be monitored over a period of time and transitions in signal data can be identified to monitor the key fob 41 as it moves. The method 200 proceeds to step 230.

At step 230, location information is generated based on the attributes of the short-range wireless signal by processing the signal data. The PEPS system can locate the key fob 41 based on data from the directional sensors 47a-47f. The signal data can be passed from the plurality of directional sensors 47a-47f to the VSM 42, such as the VSM 42 implemented as a body control module, and processed to determine the particular location of the key fob 41. Broadly speaking, the signal data can be converted to a key fob location in the form of location information. Signal data collected by the directional sensors 47a-47f including short-range wireless signal attributes, such as RSSI, AoA, or AoD, can represent a particular location of the key fob 41. In one implementation, the key fob 41 can be moved to various locations outside of and inside of the vehicle 10 during an experimental period while the directional sensors 47a-47f generate signal data. Given the spaced apart locations and particular directions of each directional sensor 47a-47f, every movement or location of the key fob 41 can initiate a unique set of signal data generated by the directional sensors 47a-47f. The signal data generated by the directional sensors 47a-47f for each location of the key fob 41 during the experimental period can be recorded in a computer-readable medium, such as a table or database, that relates the position of the key fob 41 with the signal data. The table can include a location associated with RSSI, AoA, or AoD values for each directional sensor 47a-47f. Later, when the key fob 41 is used with the vehicle 10 after vehicle production, the table that includes signal data and locations recorded during the experimental period can be accessed by the VSM 42 and compared with the signal data presently generated by the key fob 41 or directional sensors 47a-47f. Using measured signal data such as RSSI, AoA, and AoD, the table can be used to identify location information for the key fob 41 that reflects the precise location of the key fob 41 using the computer processing capability of its microprocessor. It should, however, be appreciated that in some implementations the location of the key fob 41 can be calculated by the key fob 41 itself in a similar way.

Other implementations for generating location information are possible in which computer logic structures can determine vehicle key fob locations or manage the signal data from the directional sensors 47a-47f. For example, the body control module can measure changes in signal data over time and make decisions based on these measurements. The body control module could determine that the directional sensor 47a detects a relatively low RSSI whereas the directional sensor 47b detects a relatively high RSSI. If the body control module determined that these two measurements changed faster than a rate consistent with key fob movement, the module could determine that sensor data from one or more of the sensors should be ignored and resulted from a reflected signal. Also, triangulation techniques can be used with the AoA or AoD measurements to geometrically located the key fob 41. The method 200 proceeds to step 240.

At step 240, the location of the key fob 41 is determined relative to the vehicle 10 based on the location information. The VSM 42 can use the location of the key fob 41 to determine its position with respect to the vehicle 10. For example, the VSM 42 can determine whether the key fob 41 is within a defined zone or area of the vehicle 10. The VSM 42 can be programmed with the area defining the interior of each vehicle 10 and when the identified location is within that interior, the VSM 42 can determine that the key fob is located within the vehicle 10. It is also possible to define a plurality of zones within the interior of the vehicle 10 and one or more zones outside of the vehicle 10. In that way, the VSM 42 can determine when the key fob 41 enters each of these zones and then permit or restrict vehicle functions based on the present of the key fob 41 in each zone. The interior of the vehicle 10 can be divided into a zone for the driver seat and a zone for the rest of the vehicle 10. Unless the key fob 41 is detected in the driver seat zone, the VSM 42 can prevent operation of the vehicle powertrain. In some implementations, one or more zones outside of the vehicle 10 can be used to progressively change vehicle functions as the key fob 41 approaches. For instance, the vehicle 10 can activate the exterior lights when the key fob 41 is detected in a first, zone or area that is furthermost from the vehicle 10. As the key fob 41 approaches, the key fob 41 can enter a second zone or area in which the doors of the vehicle 10 are unlocked. Use of the directional sensors 47a-47f can permit a relatively precise determination of the key fob location. For instance, the directional sensors 47a-47f can permit resolution of the key fob 41 to within 5-10 cm of accuracy.

In this sense, use of directional sensors can enable the vehicle 10 to meet one or more Thatcham security categories. The method 200 then ends.

It is to be understood that the foregoing is a description of one or more embodiments of the invention. The invention is not limited to the particular embodiment(s) disclosed herein, but rather is defined solely by the claims below. For example, the embodiment shown in FIGS. 2-3 depicts six different directional sensors but it is possible to implement the system and method disclosed using fewer or additional directional sensors. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of locating a key fob with respect to a vehicle, comprising the steps of:
    (a) communicating between a plurality of directional sensors used by the vehicle and a key fob via a short-range wireless signal, wherein one or more of the directional sensors located on the vehicle and one or more of the directional sensors located on the key fob detect signal attributes including an angle of arrival (AoA) or angle of departure (AoD) of the short-range wireless signal, wherein the one or more directional sensors located on the vehicle detect the angle of arrival (AoA) and wherein the one or more directional sensors located on the key fob detect the angle of departure (AoD);
    (b) generating signal data at the plurality of directional sensors and the key fob indicative of one or more attributes of the short-range wireless signal;
    (c) generating location information based on the one or more attributes by processing the signal data generated by the plurality of directional sensors and the key fob; and
    (d) determining the location of the key fob relative to the vehicle based on the generated location information.

2. The method of claim 1, wherein the plurality of directional sensors further comprises a phased array, a beam-forming antenna, or a directional antenna.

3. The method of claim 1, wherein the short-range wireless signal is received in a frequency band that is greater than 300 MHz.

4. The method of claim 1, wherein the short-range wireless signal is received in a 2.4 GHz frequency band or greater.

5. The method of claim 1, wherein the directional sensors further comprise a front-to-back ratio between 10-18 decibels (dB).

6. The method of claim 1, wherein the signal data is indicative of any one or more of the following attributes of the short range wireless signal: an angle of arrival (AoA), an angle of departure (AoD), or received signal strength indicator (RSSI) information.

7. The method of claim 1, wherein the determined location of the key fob is accurate to within 10 centimeters (cm).

8. The method of claim 1, wherein the short-range wireless signal is received at the plurality of directional signals after deflection off of an object.

9. A method of locating a key fob with respect to a vehicle, comprising the steps of:
    (a) communicating between the vehicle and a key fob via one or more short-range wireless signals transmitted according to a Bluetooth Low Energy (BLE) protocol, a Wi-Fi protocol, or both protocols, wherein the vehicle includes a plurality of directional sensors that detect signal attributes including an angle of arrival (AoA) or angle of departure (AoD) of the short-range wireless signal(s);
    (b) generating signal data at each of the plurality of directional sensors indicative of one or more attributes of the short-range wireless signal(s);
    (c) determining that the signal data from one of the plurality of directional sensors is inconsistent with the signal data from other of the plurality of directional sensors;
    (d) generating location information based on the one or more attributes by processing the signal data generated by the other of the plurality of directional sensors; and
    (e) determining the location of the key fob relative to the vehicle based on the generated location information.

10. The method of claim 9, wherein the plurality of directional sensors further comprises a phased array, a beam-forming antenna, or a directional antenna.

11. The method of claim 9, wherein the short-range wireless signal is received in a 2.4 GHz frequency band or greater.

12. The method of claim 9, wherein the directional sensors further comprise a front-to-back ratio between 10-18 decibels (dB).

13. The method of claim 9, wherein the signal data is indicative of any one or more of the following attributes of the short range wireless signal: an angle of arrival (AoA), an angle of departure (AoD), or received signal strength indicator (RSSI) information.

14. The method of claim 9, wherein the identified location of the key fob is accurate to within 10 centimeters (cm).

15. The method of claim 9, wherein the one or more short-range wireless signals are received at the plurality of directional signals after deflection off of an object.

16. A system for locating a key fob with respect to a vehicle, comprising:
    a plurality of directional sensors that detect signal attributes including an angle of arrival (AoA) or angle of departure (AoD) of a short-range wireless signal and are affixed to a vehicle;
    a vehicle system module (VSM) communicatively linked to the plurality of directional sensors and receiving signal data from the plurality of directional sensors that is indicative of one or more attributes of a short-range wireless signal transmitted from the key fob, wherein the VSM determines the position of the key fob relative to the vehicle based on the signal data from each of the plurality of directional sensors, and wherein the VSM is configured to determine that the signal data from one of the plurality of directional sensors is inconsistent with the signal data from other of the plurality of directional sensors.

17. The system of claim 16, wherein the short-range wireless signal is received in a 2.4 GHz frequency band or greater.

18. The system of claim 16, wherein the short-range wireless signal is transmitted according to a Bluetooth Low Energy (BLE) protocol, a Wi-Fi protocol, or both protocols.

19. The system of claim 16, wherein the directional sensors further comprise a front-to-back ratio between 10-18 decibels (dB).

20. The method of claim 16, wherein the signal data is indicative of any one or more of the following attributes of the short range wireless signal: an angle of arrival (AoA), an angle of departure (AoD), or received signal strength indicator (RSSI) information.

* * * * *